Aug. 22, 1961  M. E. MUSSER  2,997,608

SELF-CONTAINED POWER TRANSMISSION UNIT

Filed March 3, 1958

INVENTOR
MALCOLM E. MUSSER

BY *Dybvig & Jacox*

HIS ATTORNEYS

United States Patent Office 2,997,608
Patented Aug. 22, 1961

2,997,608
SELF-CONTAINED POWER TRANSMISSION UNIT
Malcolm E. Musser, Jackson Center, Ohio
Filed Mar. 3, 1958, Ser. No. 718,904
5 Claims. (Cl. 310—67)

This invention relates to a self-contained power transmission unit. The invention relates more particularly to a drive unit for a conveyor or the like; however, the invention is not so limited in that it may be related to various types of drive mechanisms and applications. This invention is an improvement over the structure shown in the T. R. Black Patent 2,779,205.

In the past, a gear unit or a speed reduction unit has been provided within a cylinder or drum so that the drum or cylinder rotates at a different speed from the speed of the drive shaft thereof. It has been necessary to attach the drive shaft to some type of motor means exterior of the cylinder.

It is highly desirable that a cylinder or drum which drives a conveyor belt or the like includes means therewithin for rotation of the cylinder or drum.

Hence, it is an object of this invention to provide a self-contained power transmission unit which includes a gear unit and motor means within the drive cylinder or drum for rotation thereof.

Another object of this invention is to provide such a power transmission unit which may be sturdily constructed at reasonable cost, has a minimum number of moving parts, and is long lived.

Other objects and advantages reside in the construction of parts, the combination thereof, the method of manufacture, and the mode of operation, as will become more apparent from the following description.

Figure 1:
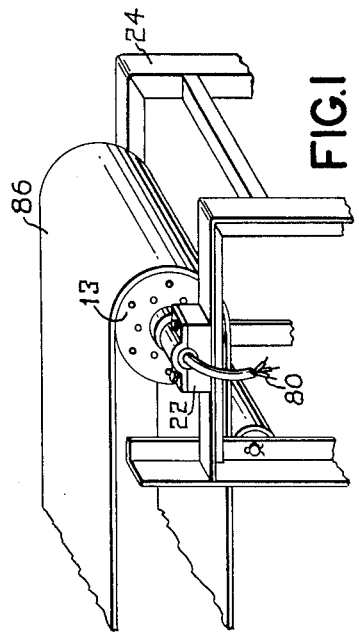
FIGURE 1 is an over-all perspective view showing a power transmission unit of this invention applied to a conveyor belt.
Figure 2:
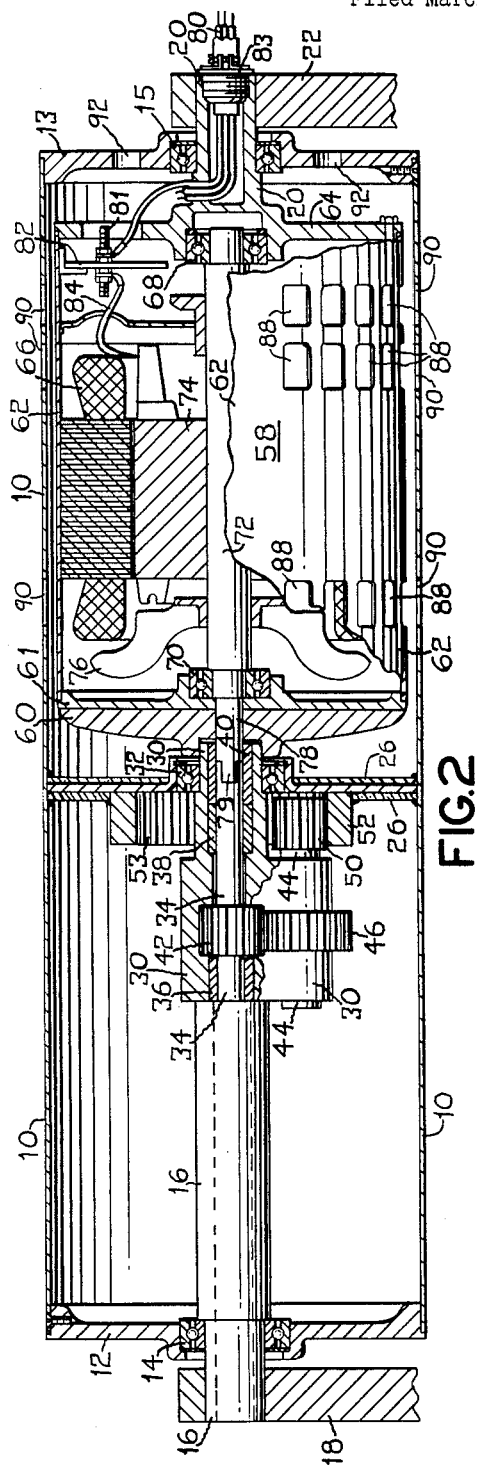
FIGURE 2 is a side sectional view, on a larger scale than FIGURE 1, of a power transmission unit of this invention.

Referring to the drawing in detail, a power transmission unit of this invention comprises a hollow cylinder or drum 10 which has at the ends thereof cover members 12 and 13, firmly attached thereto. The cylinder 10 is rotatably supported by a bearing member 14 engaging the cover member 12 and a bearing member 15 engaging the cover member 13. The bearing 14 rotatably connects the cover member 12 to a stem or shaft 16 which is non-rotatably retained in a holder member or clamp 18. The bearing 15 rotatably connects the cover member 31 to a stem or shaft 20 which is firmly and non-rotatably held by a holder member or clamp member 22. The holder or clamp members 18 and 22 are mounted upon a support structure 24, as shown in FIGURE 1. The shafts or stems 16 and 20 extend into the cylinder 10, as shown in FIGURE 2.

Within the cylinder 10 parallel with the cover members 12 and 13 is a wall member 26. A holder or carrier 30, within the cylinder 10, joins the shaft 16 and is fixedly attached thereto. It is to be understood that the holder or carrier 30 may also be a part of the shaft or stem 16. The holder 30 extends through the wall 26. A bearing member 32 rotatably connects the carrier 30 to the wall 26.

A pinion shaft 34 is rotatably supported within the carrier 30 by means of aligned bearings 36, 38, and 40. A pinion gear 42 is fixed upon the pinion shaft 34 and is thus rotatable therewith.

Also rotatably supported by the carrier 30 is an intermediate shaft 44 which is parallel with the pinion shaft 34. Fixedly attached to the intermediate shaft 44 for rotation therewith is an intermediate gear 46 which is in meshed relation with the pinion gear 42. Also rigidly attached to the intermediate shaft 44 is an intermediate pinion 50. The intermediate pinion 50 is in meshed relation with an annular gear 52 which has inwardly directed teeth 53. The gear 52 is non-rotatable with respect to the cylinder 10 and is shown herein as being rigidly carried by the wall 26.

Within the cylinder 10 at the side of the wall 26 opposite the gear member 52 is a motor 58. The carrier 30 extending through the wall 26 supports an electric motor end bell 60 which is shown as having a recess into which the carrier 30 closely fits. Rigidly secured to the end bell 60 is a plate 61 which is attached to a cylindrical housing member 62.

At the opposite end of the housing member 62 and firmly attached thereto is an end plate 64 which is shown as being integral with the shaft or stem 20. However, the end plate 64 may be rigidly secured in any other suitable manner to the shaft 20. Thus, the housing 62 is firmly, non-rotatably supported.

Within the housing 62 is a stator 66 which is rigidly secured to the housing 62 in a conventional manner.

A bearing 68 carried by the end plate 64 and a bearing 70 carried by the plate 61 rotatably support a shaft 72 within the stator 66. Firmly attached to the shaft 72 is a rotor 74. Secured to the rotor 74 is a fan 76.

The shaft 72 has a portion 78 extending through the end bell 60 and into the bearing 49. The portion 78 of the shaft 72 is joined to the pinion shaft 34 within the bearing 40 by any suitable means; herein a tongue and groove type of connection is referred to by numeral 79.

A portion of the shaft or stem 20 is hollow; a plurality of electrical conductors 80 extend therethrough and connect to a bolt 81 of a terminal board 82. A clamping bracket 83 is attached to the shaft 20 and is disposed partially therewithin for retaining the conductors 80 with respect to the shaft 20. Conductor members 84 extend from the winding of the stator 66 and also connect to the bolt 81 of the terminal board 82, as shown in FIGURE 2.

Thus, electrical energy is transmitted from an external source to the stator 66 for causing rotation of the rotor 74. As the rotor 74 rotates the shaft 72 thereof causes the pinion shaft 34 to rotate. With rotation of the shaft 34 the pinion 42 rotates. The pinion 42, in mesh with the intermediate gear 46, causes rotation thereof. Due to the fact that both the intermediate gear 46 and the intermediate pinion 50 are both attached to the intermediate shaft 44, the intermediate pinion 50 rotates with the intermediate gear 46.

Due to the fact that the pinion 50 is in meshed relation with the teeth 53 of the annular gear 52, rotation of the pinion 50 causes rotation of the cylinder or drum 10.

Thus, it is understood that all of the moving parts of the power transmission unit are within the cylinder 10. As shown in FIGURE 1, the cylinder 10 may be used for driving a conveyor belt 84.

As stated above, the wall 26 separates the gear mechanism from the electric motor 58. The portion of the cylinder 10 to the left of the wall 26, as shown in FIGURE 2, contains oil or other lubricant material for the gears and bearings within that portion of the cylinder 10. This lubricant material is sealed by the wall 26 from contact with the electric motor 58.

The housing 62 of the electric motor 58 is provided with a plurality of ventilator openings or windows 88 which may extend around a portion of the periphery of the housing 62 or may extend entirely around the periphery of the housing 62. The section of the cylinder 10 which encloses the housing 62 is provided around the periphery thereof with a plurality of openings or windows 90 which come into alignment with the openings 88 of the housing 62 during rotation of the cylinder 10. If desired, the cover member 13 of the cylinder 10 may also be provided with openings 92 for passage of air therethrough. During rotation of the cylinder 10, only a portion of the openings 90 thereof are covered by the conveyor belt 86 at any given time. Thus, the other openings 90 may have unrestricted flow of air therethrough.

Thus, as the rotor 74 rotates the fan 76 attached thereto forces movement of air through the ventilator openings 88 of the housing 62 and through the openings 90 of the cylinder 10 for cooling the rotor 74 and the stator 66.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A self-contained operating mechanism for a conveyor belt or the like including a hollow cylinder, support means rotatably supporting the cylinder, the support means extending into the cylinder at each end thereof, a wall member within the cylinder firmly attached thereto and separating the cylinder into two compartments, a first carrier member, the first carrier member being within one of the compartments of the cylinder and attached to the support means, the carrier member having a portion extending through the wall member, a gear unit rotatably supported by the first carrier member within the same compartment as the carrier member, the gear unit including an annular gear attached to the wall member and in meshed relation with a portion of the gear unit for rotation of the cylinder, a motor member at the other side of the wall member and in the other compartment, a second carrier member, the second carrier member being within the other compartment and attached to the support means, the motor member being firmly supported by the second carrier member, the motor member including a rotatable shaft extending through the wall member and connected to the gear unit for rotation thereof, and energy transmission means extending through the support means and connected to the motor member for operation thereof.

2. A self-contained power transmission mechanism comprising a hollow cylinder, a pair of cover plates closing the cylinder, there being one plate at each end of the cylinder, a pair of stems, there being a stem extending through each of the cover plates at the center thereof, a pair of bearing members, there being a bearing member rotatably connecting each of the cover plates to the stem which extends therethrough, a solid wall within the cylinder and attached thereto substantially parallel to the cover plates, the wall thus dividing the cylinder into two compartments having a plurality of ventilating holes and, one of the compartments being a ventilated motor compartment and the other compartment being a sealed gear compartment, the stem which extends into the gear compartment having a hollow portion which extends through the wall at the center thereof and into the motor compartment, a bearing member engaging the exterior of said hollow portion and the wall member rotatably connecting said hollow portion to the wall member, a bearing within the hollow portion, a motor in the motor compartment and supported by the stems, the motor having a drive shaft extending through the hollow portion and rotatably carried by the last said bearing, a pinion gear carried by the drive shaft within the gear compartment, an annular gear within the gear compartment and firmly attached to the wall, and gear means connecting the pinion gear to the annular gear.

3. A self-contained power transmission unit comprising support structure, a pair of stem members firmly carried by the support structure, a hollow cylinder, a solid wall within the cylinder and attached thereto dividing the cylinder into two compartments, the cylinder having a plurality of holes therethrough leading to one of the compartments, said compartment being a ventilated compartment, the other compartment being a sealed compartment, each of the stem members extending into one of the compartments of the cylinder and rotatably supporting the cylinder, a gear unit carried by one of the stem members within the sealed compartment of the cylinder, the gear unit including means firmly attached to the wall for rotation of the cylinder, an electric motor stator within the ventilated compartment of the cylinder and rigidly supported by the stem member within that compartment, a rotor rotatably carried within the motor stator, a shaft connected to the rotor and extending through the said stem member which extends through the wall, the shaft being attached to the gear unit for rotation thereof, and electric conductor members attached to the motor stator and extending through a portion of the stem member which supports the stator, the conductor members being electrically connected to the stator for energization thereof.

4. A self-contained power transmission unit comprising an elongate hollow cylinder, the cylinder having a cover plate at each end thereof closing the cylinder, a pair of support stems, there being a support stem extending through each of the cover plates, a pair of bearing members, there being one bearing member mounted within each of the cover plates and mounted upon the stem which extends through the cover plate, a solid wall within the cylinder and firmly attached to the internal walls thereof, the wall being parallel to the cover plates and dividing the cylinder into two axially aligned compartments, one of the compartments having a plurality of holes leading thereto through the cylinder and being a ventilated compartment, the other compartment being a sealed compartment, one of the stem members having a hollow portion extending through the wall, a bearing member mounted in the wall and mounted upon said hollow portion of the stem and rotatably providing supporting relation between the wall and said hollow portion of the stem, a motor within the ventilated compartment, the motor being firmly supported by the stem which extends into the ventilated compartment, a bearing within said hollow portion of said stem, the motor having a shaft extending through the last said bearing and rotatably carried thereby, the shaft also extending into the sealed compartment, a pinion gear within the sealed compartment and attached to the shaft adjacent the end thereof, a gear assembly carried by the stem within the sealed compartment and in meshed relation with said pinion gear, an annular gear attached to said wall and in mesh with the gear assembly.

5. In a self-contained power transmission unit for a conveyor belt or the like, an elongate hollow cylinder, a solid wall member within the cylinder dividing the cylinder into two substantially equal axially aligned compartments, a pair of cover members, there being a cover member at each end of the cylinder and attached thereto, the cylinder and one cover member having holes therethrough leading into one of the compartments and providing a ventilated compartment, the other compartment being a sealed compartment, an electric motor within the ventilated compartment, a pair of stems, there being a stem extending into the cylinder at each end thereof through the cover member thereof and rotatably supporting the cylinder, a third stem, the third stem extending through the wall member and into each of the compartments, bearing means in engagement with the third stem and with the wall member so that there is supporting relation between the third stem and the wall member, an electric motor within the ventilated compartment and supported by the stems which extend into the ventilated compartment, an annular internal gear within the sealed compartment and attached to said wall member for rotation of the cylinder, gear means within the sealed compartment and carried by the stems which extend into the sealed compartment, the gear means being in meshed relation with the annular gear, rotary shaft means connected to the motor and extending through the stem which extends through said wall member, the stem also being connected to the gear means for operation thereof, a sleeve bearing rotatably supporting the shaft means and disposed within said stem which extends through the wall member, and lubricating fluid contained by the sealed compartment.

References Cited in the file of this patent

UNITED STATES PATENTS

| | | |
|---|---|---|
| 1,323,245 | Borkes | Dec. 2, 1919 |
| 2,540,099 | Christian | Feb. 6, 1951 |
| 2,608,598 | Hawkins et al. | Aug. 26, 1952 |

UNITED STATES PATENT OFFICE
CERTIFICATE OF CORRECTION

Patent No. 2,997,608                                    August 22, 1961

Malcolm E. Musser

It is hereby certified that error appears in the above numbered patent requiring correction and that the said Letters Patent should read as corrected below.

Column 3, lines 61 and 62, for "into two compartments having a plurality of ventilating holes and, one of the compartments being a ventilated" read -- into two compartments, one of the compartments having a plurality of ventilating holes and being a ventilated --.

Signed and sealed this 13th day of February 1962.

(SEAL)
Attest:

ERNEST W. SWIDER                                        DAVID L. LADD
Attesting Officer                                           Commissioner of Patents